(No Model.) 3 Sheets—Sheet 1.

J. M. HOWE.
Dry Plate Holder for Photographic Cameras.

No. 243,136. Patented June 21, 1881.

WITNESSES:
H. G. Phillips
Wm. M. Rebasz Jr.

INVENTOR:
John M. Howe,
by G. B. Selden,
Atty.

(No Model.) 3 Sheets—Sheet 2.
J. M. HOWE.
Dry Plate Holder for Photographic Cameras.
No. 243,136. Patented June 21, 1881.
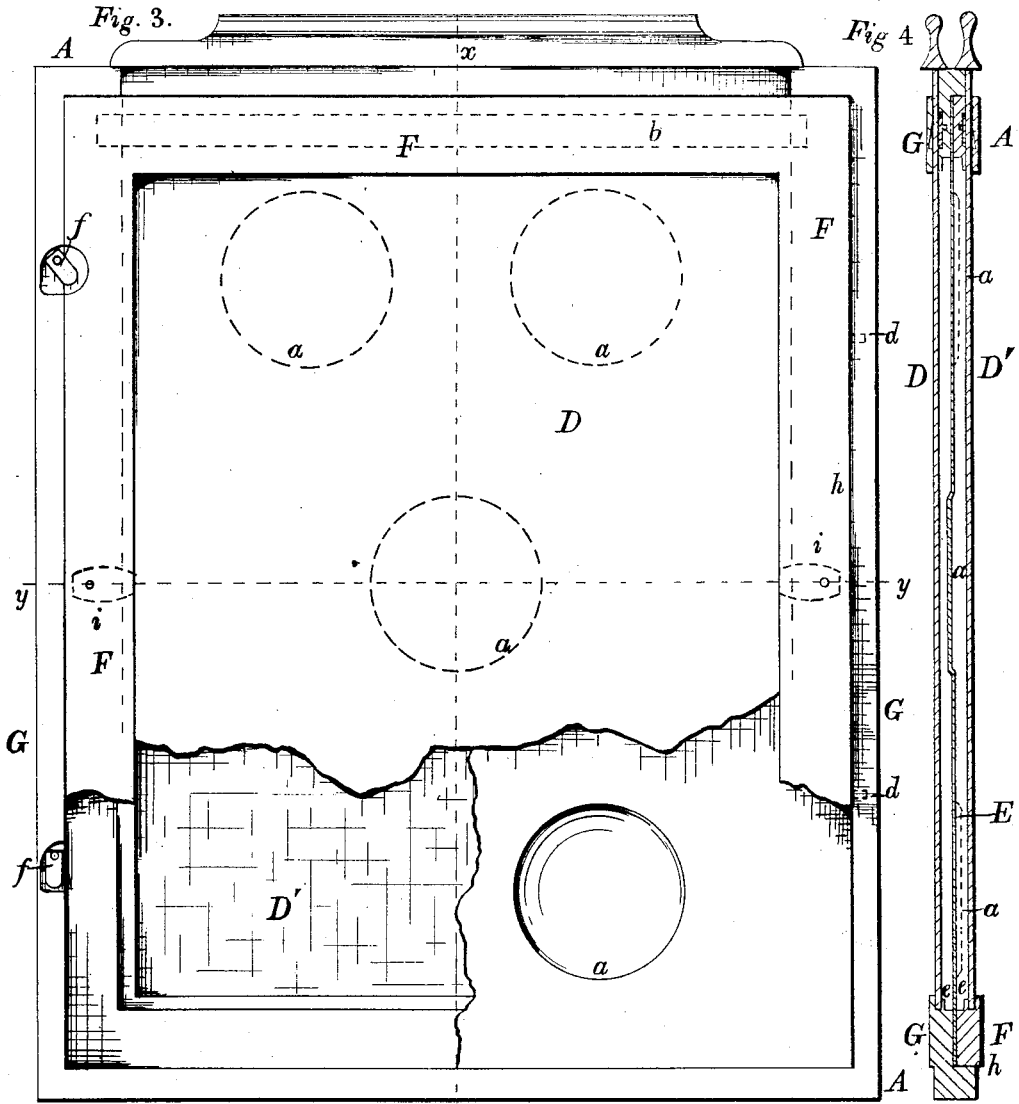
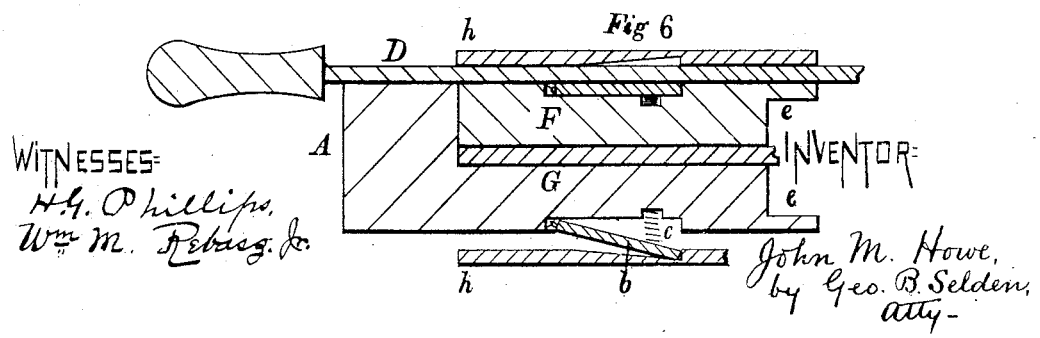
WITNESSES:
H. G. Phillips.
Wm. M. Rebasz, Jr.
INVENTOR:
John M. Howe,
by Geo. B. Selden,
Atty.

(No Model.) 3 Sheets—Sheet 3.
J. M. HOWE.
Dry Plate Holder for Photographic Cameras.
No. 243,136. Patented June 21, 1881.
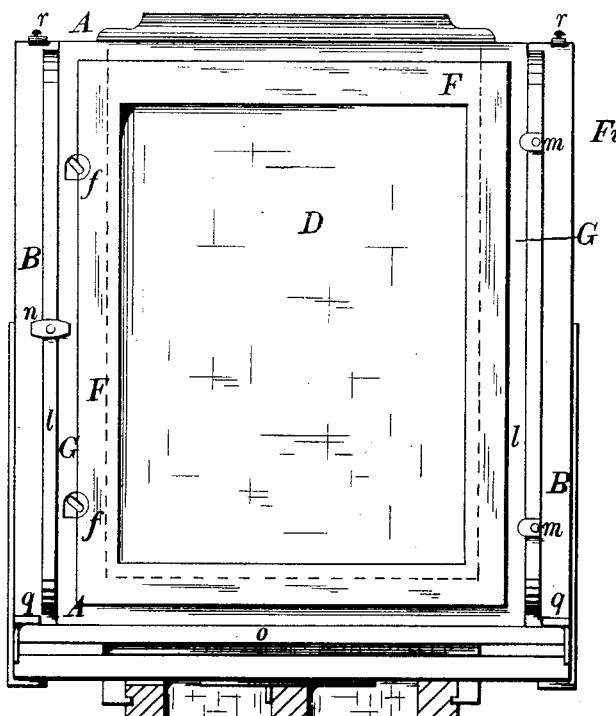
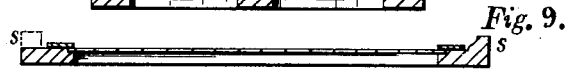
Fig. 13.
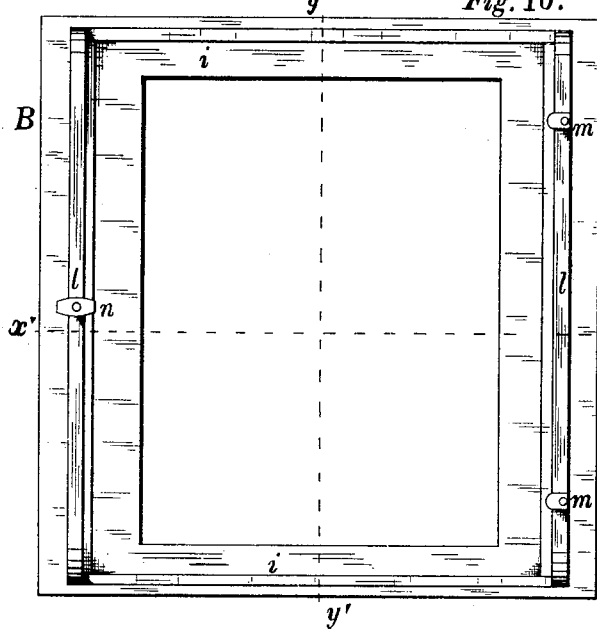
Fig. 11.
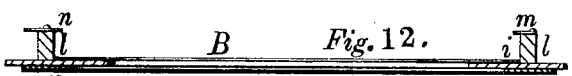
WITNESSES:
H. G. Phillips.
Wm. M. Rebasz, Jr.
INVENTOR:
John M. Howe,
by G. B. Selden,
atty.

UNITED STATES PATENT OFFICE.

J. MILTON HOWE, OF SAN FRANCISCO, CALIFORNIA.

DRY-PLATE HOLDER FOR PHOTOGRAPHIC CAMERAS.

SPECIFICATION forming part of Letters Patent No. 243,136, dated June 21, 1881.

Application filed April 4, 1881. (No model.)

*To all whom it may concern:*

Be it known that I, JOHN MILTON HOWE, a citizen of the United States, residing at San Francisco, California, have invented certain Improvements in Dry-Plate Holders for Photographic Cameras, of which the following is a specification, reference being had to the annexed drawings.

The object of my invention is the production of a light but strong and durable dry-plate holder of the smallest dimensions capable of containing the plates of the desired sizes, and which, by means of my improved reversible adapter, may be applied to the camera with the length of the plate in either the vertical or horizontal position; and my invention consists in an improved construction of dry-plate holders, and in the adapter just mentioned, as hereinafter more fully pointed out.

By the term "adapter," as herein used, is meant a device for connecting the plate-holder with the camera-body.

Figure 1:
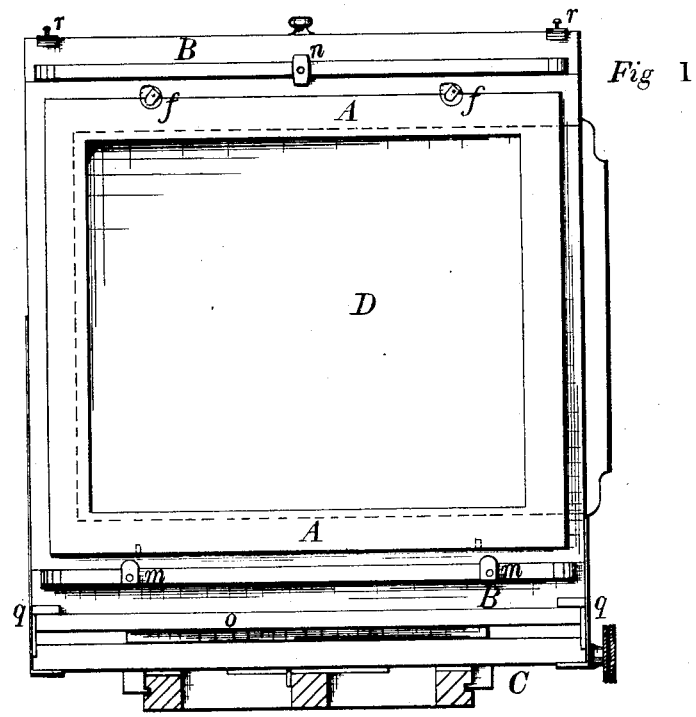
Figure 2:
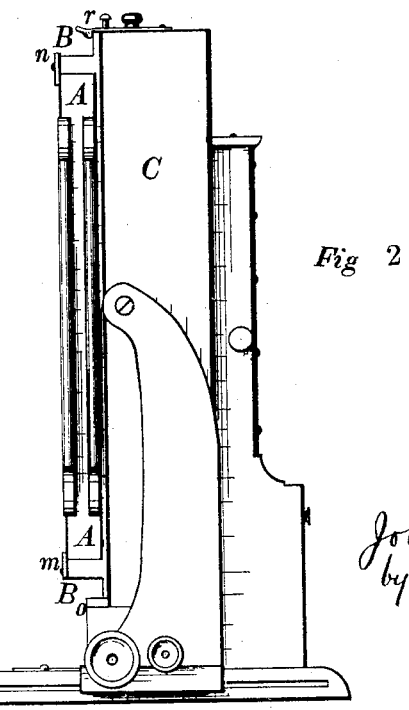

My improvements in photographic cameras are represented in the accompanying drawings, in which Figure 1 is a rear view of a camera embodying my invention. Fig. 2 is a side elevation of the same. Fig. 3 is a plan view of my improved dry-plate holder, a portion thereof being broken away. Fig. 4 is a longitudinal section of the same on the line $x\,x$, Fig. 3. Fig. 5 is a transverse section of the same on the line $y\,y$, Fig. 3. Fig. 6 is an enlarged partial section on the line $x\,x$, Fig. 3. Fig. 7 is a section of the inner holder-frame on the line $y\,y$, Fig. 3. Fig. 8 is a rear view of the camera, showing my improved adapter and holder reversed. Fig. 9 is a transverse section through the ground-glass frame. Fig. 10 is an elevation of the adapter detached. Fig. 11 is a side view of the adapter. Fig. 12 is a transverse section through the adapter on the line $x'\,x'$, Fig. 10. Fig. 13 is a longitudinal section through the same on the line $y'\,y'$, Fig. 10.

In the accompanying drawings I have represented my improved dry-plate holder and adapter as applied to a camera of the ordinary construction; but my improved holder may be made of a form corresponding with any camera, and used thereon without the adapter.

In the accompanying drawings, A represents my improved holder, B the reversible adapter, C the camera, D D' the shutters, and E the opaque partition which separates the plates.

The holder A, which may be of any desired size to suit the camera on which it is to be used, is composed of an inner frame, F, and an outer frame, G, Figs. 3, 4, 5, 6, and 7. The inner frame, F, is fitted within the outer frame, as shown most clearly in the sectional views, being secured in place therein by the pins $d\,d$ and the buttons $f\,f$, which are preferably sunk within a recess in the frames. By this construction I secure great strength in the frame G, while the holder, consisting of the combined frames, is as thin as it can be made, the plates $g\,g$ resting together back to back, being merely separated from each other by the thin opaque partition E. At the same time the light is entirely prevented from entering the joints between the frames, which frequently happens with double holders of the ordinary form where the frames are simply hinged together at one side. The sides of the frame are L-shaped in cross-section, forming a recess into which the inner frame is fitted. The sides of the outer frame may be made in one piece, or they may be made of two or more longitudinal strips glued together in the required form.

Each frame is provided with a shutter, D and D', sliding lengthwise in suitable grooves in the inner edges of the frame, by which the exposure of the plate in the camera is effected. Each shutter is provided with a hinged flap, $b\,b$, and a spring, $c\,c$, Fig. 6, located within recesses in the outer end of the holder-frames, for the purpose of preventing light from passing through the slot in the frame when the shutter is removed. Each frame is provided with a shoulder, $e\,e$, running all round the inside of the frame, against which the margin of the plate rests, as indicated by the dotted lines $g\,g$ in Fig. 5. Each frame is provided all around on the outside, a short distance from the edge, with a projecting shoulder, $h\,h$, Figs. 5 and 6, which fits a corresponding recess, $i\,i$, Fig. 10, in the adapter, or in the rear frame of the camera, for the purpose of preventing the light from entering the camera between the adapter and the holder. This shoulder or projection is made of the same size on each side, so that it may be applied to the adapter or camera in position to expose either plate.

The partition E, which separates the plates, may be made of any suitable material. Pasteboard embossed, as shown at $a\ a\ a$, Figs. 3, 4, and 5, so that the plates are held firmly against the shoulders $e\ e$ by the elasticity of the raised portions, answers the purpose perfectly. Sheet metal embossed or provided with a spring may also be employed.

The partition E is preferably made of the same size with the inner frame, the pins $d\ d$ and the catches $f\ f$ being so arranged that when the frames are put together the partition will be held firmly between them.

Either or both of the frames may be provided with buttons $i\ i$, turning in a recess, for holding the plates in place.

My improved adapter consists of a frame, B, provided with longitudinal ribs $l\ l$, Figs. 8, 10, 11, and 12, placed at a suitable distance apart to receive the holder between them. The holder is secured in place on the adapter by the catches $m\ m$ and the button $n$, or by any other suitable device, the holder, when arranged with the length of the plate in the vertical position, as shown in Fig. 8, resting upon the ledge $o$ of the camera-frame.

On its inner side the adapter is provided with a shoulder, $p$, extending all the way around, a short distance within the margin, which fits a corresponding recess in the rear camera-frame, for the purpose of excluding the light between the adapter and the camera.

The adapter is secured to the camera by the lugs $q\ q$ on the ledge $o$, and the spring-catches $r\ r$ on the upper side of the camera.

The adapter is reversible—that is, the holder and the adapter occupying the same relative positions, the adapter may be placed in the camera so that the length of the plate is either horizontal or vertical, as shown in Figs. 1 and 8, respectively.

The ground-glass frame, which is applied to the adapter for the purpose of adjusting the focus, is represented in the sectional view in Fig. 9. It is provided with lugs $s\ s$, which fit under the catches $m\ m$, and the button $n$, by which it is held in place on the adapter.

I am aware that I am not the first to produce a holder adapted to receive two dry plates.

I claim—

1. The herein-described dry-plate holder, consisting of the outer frame, G, and inner frame, F, constructed and arranged substantially as and for the purposes set forth.

2. In combination with a dry-plate holder, the reversible adapter B, substantially as and for the purposes set forth.

J. MILTON HOWE.

Witnesses:
L. MEININGER,
JAMES CASEY.